(12) United States Patent
Kanamaru et al.

(10) Patent No.: US 9,651,408 B2
(45) Date of Patent: May 16, 2017

(54) STRUCTURE OF PHYSICAL SENSOR

(71) Applicant: Hitachi Automotive Systems, Ltd., Hitachinaka-shi, Ibaraki (JP)

(72) Inventors: Masatoshi Kanamaru, Tokyo (JP); Takanori Aono, Tokyo (JP); Masahide Hayashi, Hitachinaka (JP); Heewon Jeong, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/773,122

(22) PCT Filed: Dec. 20, 2013

(86) PCT No.: PCT/JP2013/084183
§ 371 (c)(1),
(2) Date: Sep. 4, 2015

(87) PCT Pub. No.: WO2014/136358
PCT Pub. Date: Sep. 12, 2014

(65) Prior Publication Data
US 2016/0003650 A1    Jan. 7, 2016

(30) Foreign Application Priority Data
Mar. 8, 2013    (JP) .................... 2013-046092

(51) Int. Cl.
*B81B 1/00*    (2006.01)
*G01D 11/24*    (2006.01)
*G01C 19/5783*    (2012.01)

(52) U.S. Cl.
CPC ....... *G01D 11/245* (2013.01); *G01C 19/5783* (2013.01)

(58) Field of Classification Search
CPC ...................................................... G01D 11/24
(Continued)

(56) References Cited

U.S. PATENT DOCUMENTS 5,719,335 A * 2/1998 Nakaishi ............... G01C 19/24
                                                        73/504.12
5,781,985 A   7/1998 Nakaishi et al.
(Continued)

FOREIGN PATENT DOCUMENTS

DE    10 2012 208 761 A1    11/2012
JP           7-71965 A          3/1995
(Continued)

OTHER PUBLICATIONS

International Search Report (PCT/ISA/210) dated Feb. 18, 2014 with English translation (five pages).
(Continued)

*Primary Examiner* — Lisa Caputo
*Assistant Examiner* — Jamel Williams
(74) *Attorney, Agent, or Firm* — Crowell & Moring LLP

(57) ABSTRACT

To suppress variations of a vacuum pressure atmosphere in a physical sensor, a physical sensor in which a sensing part that measures a physical quantity is provided in a vacuum space, includes a sensor part in which a plurality of substrates are stacked, and a cavity substrate 9 having a space and provided on an upper surface side or a lower surface side of the sensor part by bonding, wherein the sensing part communicates with a space of the cavity substrate via a ventilation passage 11*a* provided in the sensor part.

15 Claims, 2 Drawing Sheets

(58) Field of Classification Search
USPC .............................................. 73/431
See application file for complete search history.

(56) References Cited

U.S. PATENT DOCUMENTS

| | | |
|---|---|---|
| 2002/0051258 A1 | 5/2002 | Tamura |
| 2004/0182165 A1 | 9/2004 | Miyashita |
| 2005/0176179 A1* | 8/2005 | Ikushima ............... H01L 37/02 438/125 |
| 2005/0227401 A1 | 10/2005 | Lee et al. |
| 2007/0220972 A1 | 9/2007 | Araki et al. |
| 2011/0048129 A1 | 3/2011 | Yamanaka et al. |
| 2012/0299127 A1 | 11/2012 | Fujii et al. |
| 2014/0306300 A1* | 10/2014 | Gunthner ............ G01P 15/0802 257/417 |
| 2015/0040675 A1* | 2/2015 | Ding ..................... G01L 19/04 73/754 |
| 2015/0068315 A1* | 3/2015 | Davis ................. G01L 19/0007 73/727 |
| 2015/0102437 A1* | 4/2015 | Liu ..................... B81B 3/0021 257/419 |
| 2015/0375995 A1* | 12/2015 | Steimle ............. B81C 1/00238 257/418 |

FOREIGN PATENT DOCUMENTS

| | | |
|---|---|---|
| JP | 10-206455 A | 8/1998 |
| JP | 2002-5950 A | 1/2002 |
| JP | 2008-66521 A | 3/2008 |
| JP | 2012-88319 A | 5/2012 |
| WO | WO 2006/006597 A1 | 1/2006 |
| WO | WO 2010/119573 A1 | 10/2010 |

OTHER PUBLICATIONS

Extended European Search Report issued in counterpart European Application No. 13877142.3 dated Jan. 27, 2017 (nine (9) pages).

* cited by examiner

STRUCTURE OF PHYSICAL SENSOR

TECHNICAL FIELD

This invention relates to a structure of a physical sensor used for measurement of a physical quantity, and specifically to a structure of a physical sensor for measurement of a physical quantity such as an acceleration or an angular velocity.

BACKGROUND ART

Recently, with development of microfabrication in Micro Electro Mechanical Systems technology, various sensors for measurements of physical quantities including accelerations and angular velocities to which materials including silicon and glass are applied have been provided.

The physical sensors may be applied to various structures because three-dimensional structures and movable structures of silicon can be formed according to an advantage that enables formation of a structure having a higher aspect ratio (aperture width/processing depth) than that of a semiconductor device, and a processing method that enables processing of a groove having a higher aspect ratio using dry etching to which an RIE (Reactive Ion Etching) apparatus of an ICP (Induction Coupled Plasma) system is applied, and processing accuracy is higher than that of mechanical processing.

In a structure of a general physical sensor, movable mechanism parts such as oscillators or movable bodies are provided on a silicon substrate and a glass substrate using the Micro Electro Mechanical Systems technology, drive gaps are provided in locations corresponding to the movable mechanism parts including oscillators or movable bodies on a cap substrate, and these substrates are sealed by joining, bonding, or the like. The sizes of these movable mechanism parts are of the order of microns, and a problem of characteristics degradation is caused by influences of air resistance or the like. It is necessary to seal sensing parts in a pressure atmosphere corresponding to the movable mechanism parts including the respective oscillators or movable bodies.

Of the physical sensors, a combo sensor in which an accelerometer and a gyroscope are provided on the same substrate is sealed in a pressure atmosphere in which characteristics of the respective accelerometer and gyroscope are not degraded. Generally, a combo sensor in which characteristics are not degraded by sealing of a sensing part of the accelerometer at atmospheric pressure and sealing of a sensing part of the gyroscope in vacuum is provided.

The gyroscope has an oscillator as the movable mechanism part and when an angular velocity is applied while the oscillator is driven (oscillated) at a natural frequency, a Coriolis force is generated. The oscillator is displaced by the Coriolis force. The angular velocity can be detected by detection of the amount of displacement of the oscillator by the Coriolis force. As the drive speed of the oscillator is higher, the Coriolis force is larger, and it is necessary to oscillate the oscillator at a higher frequency with a larger amplitude for better detection sensitivity of the gyroscope.

However, an oscillator fabricated by the in Micro Electro Mechanical Systems technology is formed with a small gap, and thus, when the oscillation atmosphere is at the atmospheric pressure, the influence of the damping effect of the air (sealed gas) is larger. The damping effect adversely affects the oscillation of the gyroscope at the higher frequency with the larger amplitude, and degrades the detection sensitivity of the gyroscope. Therefore, the sensing part of the gyroscope is sealed in an atmosphere with the less influence of the damping effect, i.e., in vacuum, and thereby, the gyroscope at the higher frequency with the larger amplitude may be obtained. Further, with higher vacuum, the influence of the damping effect is even smaller.

It is important to obtain a stable vacuum atmosphere in the space containing the drive part and the detection part of the gyroscope, and the detection sensitivity of the gyroscope may be stabilized.

On the other hand, the accelerometer has a movable body such as a weight or beam as the movable mechanism part, and the movable body is displaced when an acceleration is applied. The acceleration is detected by detection of the amount of displacement of the movable body. When the accelerometer is sealed in the same vacuum atmosphere as that for the gyroscope, the influence of the damping effect on the movable body of the accelerometer is smaller, and a phenomenon of continued oscillation occurs and disables detection of the acceleration with higher sensitivity. Therefore, the accelerometer is sealed under the atmospheric pressure atmosphere providing the larger damping effect.

There is Patent Literature 1 as a known example of a combo sensor device in which an accelerometer and a gyroscope are combined. In PTL 1, the accelerometer and the gyroscope are integrally formed, the gyroscope is sealed in vacuum, then, an air pressure state for suppression of high-frequency oscillation is formed or a damping agent is enclosed using a ventilation passage formed in a cap substrate at the accelerometer side for changing atmospheres of respective sensor parts, and then, the ventilation passage is sealed by welder or the like. Further, a method of forming a desired vacuum state using a gas venting passage provided in the gyroscope part, and subsequently, blocking the passage to hold the vacuum is described. Anodic bonding is applied.

Or, there is Patent Literature 2 as a known example for holding a vacuum atmosphere of a package electronic part. In PTL 2, with a space formed by an element substrate on which an infrared detection element is provided and a side wall as a first space and a space of a getter (absorbent) substrate provided on the rear side of the element substrate as a second space, both spaces are connected by a hole for increasing the first space.

CITATION LIST

Patent Literatures

PTL 1: JP-A-2002-5950
PTL 2: JP-A-2008-66521

SUMMARY OF INVENTION

Technical Problems

In a combo sensor in which an accelerometer and a gyroscope are combined, a gyroscope sensor part is in a vacuum atmosphere and, an accelerometer sensor part is in an atmospheric pressure atmosphere. Accordingly, generally, a sealing method of the combo sensor should select either of atmospheric pressure or vacuum to bond a substrate to be finally sealed. Then, a method of forming a hole in the accelerometer sensor part or the gyroscope sensor part, forming a target pressure atmosphere, and closing the hole is used.

PTL 1 describes those methods. In PTL 1, a structure of adjusting the accelerometer sensor under atmospheric pressure and the gyroscope sensor at vacuum pressure is good, however, variations of the pressure atmosphere as vacuum in the gyroscope part are not considered.

Generally, to stabilize vacuum pressure within a vacuum chamber, a heater for heating is provided on the outer periphery of the vacuum chamber, and evacuation is performed by a vacuum pump while baking is performed. Various gas components (outgases) attached to the inner wall of the vacuum chamber are evaporated by heating by baking and removed by the vacuum pump, and thereby, the pressure within the vacuum chamber is stabilized.

On the other hand, the sizes of the movable mechanism parts of the gyroscope fabricated by the Micro Electro Mechanical Systems technology are of the order of microns, the gap between the drive parts and the detection parts is as small as 3 µm or less, and a comb is densely provided. Accordingly, the space in which the movable mechanism part is formed has a larger surface area with respect to its volume.

Further, when the gyroscope is bonded in vacuum, though, different depending on the bonding method, generally, in view of generation of minute generated gas and being held in the vacuum atmosphere at bonding, it is predictable that vacuum pressure within the gyroscope is lower due to the generation of minute generated gas in the long term.

In consideration of the facts, in PTL 2, in consideration of the influence of the pressure atmosphere, i.e., the influence of minute generated gas (outgas) generated while being held in vacuum or minute generated gas generated by heating at bonding, the getter substrate is provided on the rear side of the element substrate for coping with pressure variations. However, the getter substrate has a penetrating wiring structure, and thus, the getter can be provided only inside of the penetrating wiring and the spatial volume of the getter is limited. Further, the volume of the second space may be increased only in the height direction because the substrate is provided on the rear side of the element substrate. In addition, anisotropic etching of silicon is applied for connection between the first space and the second space, and the infrared detection element should be protected and the process is considered to be complicated.

That is, in a small sensor manufactured by the Micro Electro Mechanical Systems process, when pressure varies in the pressure atmosphere within the sensor for sensing the physical quantity due to the minute generated gas or the gas generated at bonding, it may be impossible to obtain the stable pressure atmosphere because the spatial volume is limited.

An object of the invention is to provide a structure for suppressing variations of a vacuum pressure atmosphere in a physical sensor.

Solution to Problems

In order to achieve the object, a physical sensor of the invention has e.g. the following configuration. That is, a physical sensor in which a sensing part for measurement of a physical quantity is provided in a vacuum space, includes a sensor part formed by stacking of a plurality of substrates, and a cavity having a space and provided on an upper surface side or a lower surface side of the sensor part by bonding, wherein the sensing part communicates with the space of the cavity substrate via a ventilation passage provided in the sensor part.

Advantageous Effects of Invention

According to the invention, variations of a vacuum pressure atmosphere in a physical sensor can be suppressed.

DESCRIPTION OF EMBODIMENTS

Figure 1:
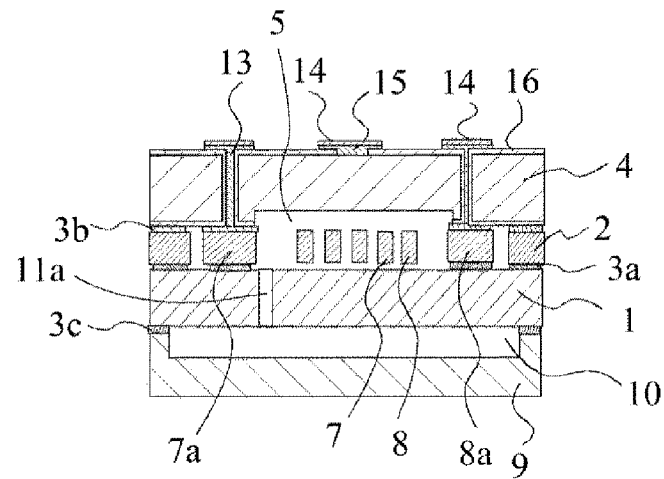
FIG. 1 is a sectional view of arrangement of a cavity substrate on the lowermost surface of the invention.

A structure example of a physical sensor according to the invention will be explained using FIG. 1. FIG. 1 shows a sectional view of a sensor for sensing an angular velocity, and a device substrate 2 is formed on a handle substrate 1 via an oxide film 3a of $SiO_2$. An electrode substrate 4 is provided above a device layer via a bonding layer 3b. A cavity substrate 9 is bonded to a lower surface of the handle substrate 1 via a bonding layer 3c.

A sensing space 5 in a vacuum atmosphere as a pressure atmosphere is formed in a space of the handle substrate 1 and the electrode substrate 4 provided above and below. A fixed electrode 7 and a detection electrode 8 are formed in the sensing space 5. A plurality of combs with gaps of several microns are formed therein. The cavity substrate 9 is formed to have the same outer dimensions as the dimensions of the device substrate, and a cavity space 10 is formed therein. The cavity space communicates with the sensing space 5 of the device substrate via a ventilation passage 11a formed in the handle substrate 1.

Accordingly, the spatial volume of the sensing space 5 in which the pressure atmosphere of the space is in vacuum is a volume with the addition of the cavity space 10 formed in the cavity substrate 9, and the space has the larger spatial volume.

Further, regarding the electrical exchange between the device substrate 2 and the outside, the fixed electrode 7 of the device substrate is planarly connected to a fixed electrode 7a and connected via a penetrating wire 13 provided inside of the electrode substrate 4 to a metal electrode 14 formed thereon. Similarly, the detection electrode 8 is planarly connected to a detection electrode 8a of the device substrate and connected via a penetrating wire 13 provided inside of the electrode substrate 4 to a metal electrode 14 formed thereon.

The part surrounding the penetrating wire 13 formed inside of the electrode substrate 4 is electrically insulated by an oxide film 16 of SiO2 or the like. Note that an earth 15 of the electrode substrate is an electrode for electrically grounding of the electrode substrate.

The material of the penetrating wire 13 is preferably Poly-Si doped with phosphorus or the like. This is because Poly-Si is thermally strong and has a coefficient of linear expansion equivalent to that of silicon.

Regarding the electrical exchange with the outside, gold wire bonding is welded to the metal electrode 14 provided on the electrode substrate 4 and drawn. Note that the position of the metal electrode 14 can be planarly drawn around to an arbitrary position on the surface of the electrode substrate by a metal wire. Further, the other parts than the metal electrode part are protected by a protective film of SiN and a resin. The same technology as that for a general protective film of a semiconductor circuit may be applied to the protective film around the metal electrode.

In addition, for the metal wire material, chromium or titanium may be provided as a foundation film in consideration of adhesion and gold may be provided thereon. Further, platinum or nickel may be provided between the chromium or titanium and gold for improvement of thermal resistance to heat. The wire material is not limited to those described above, but a wire material of aluminum or the like may be applied.

In the above described structure, an SOI (Silicon on Insulator) substrate may be applied to the handle substrate 1, the device substrate 2, and the oxide film 3a of SiO2.

Generally, an SOI wafer includes a handle layer, a Box layer, and a device layer. The Box layer is removed after the device structure is formed for formation of a movable part. More specifically, a structure including combs is processed in the device layer by deep dry-etching processing, then, the Box layer is removed, and thereby, the comb structure may be floated in midair. Accordingly, when the Box layer is made thicker, speeds are equivalent between the etching in the depth direction and the etching in the planar direction, and, when the layer is removed, the part fixing the drive combs etc. may be lost. This is because the Box layer is formed by an oxide film of SiO2 and isotropically etched by hydrofluoric acid solution or vapor of hydrofluoric acid. Accordingly, when the Box layer is made thicker, the part fixing the drive combs etc. is larger and downsizing is harder, and thus, the Box layer should be formed to be thinner. As a result, the gap of the lower surface of the device layer, i.e. between the handle substrate 1 and the lower surfaces of the fixed electrode 7 and the detection electrode 8 in the invention is as small as several microns. Naturally, the volume of the sensing space 5 become smaller and, when minute generated gas is generated, it may be impossible to hold the target pressure. In the invention, even when the SOI substrate is applied, the spatial volume of the sensing part for physical quantity may be made significantly larger by connection of the cavity space 10 and the sensing space 5, and thus, the SOI substrate may be used.

Figure 2:
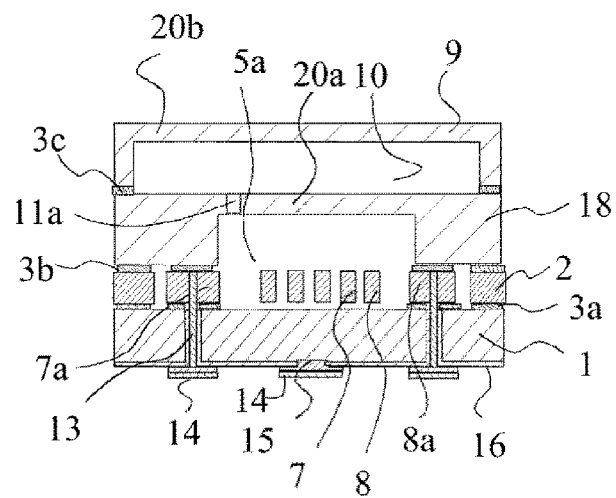
FIG. 2 is a sectional view for explanation of the arrangement of the cavity substrate on the uppermost surface of the invention.

In the invention, the above described cavity substrate is provided on the lowermost surface in FIG. 1, however, when an electrode is drawn from the handle substrate, a structure shown in FIG. 2 can be applied.

The structure in FIG. 2 is the same as that in FIG. 1 in the structure of the device substrate, however, the electrode is drawn to the lower surface side in FIG. 2 using the penetrating wire 13 formed within the handle substrate 1. The cavity substrate 9 of the invention is provided on the uppermost surface and communicates with a sensing space 5a of the device substrate 2 via the ventilation passage 11a formed within a cap substrate 18. Further, the larger sensing space 5a can be formed in the cap substrate 18.

Regarding the cavity space formed in the cavity substrate 9 of the invention shown in FIGS. 1 and 2, the spatial volume may be formed to be larger because the range except the bonding part in the outer periphery may be used as a space and the depth may be adjusted by the substrate thickness. Accordingly, a physical sensor that may suppress pressure variations, stably keep the degree of vacuum of the sensing space formed in the device substrate 2, and have advantageous yield may be provided.

Further, the cavity substrate 9 having the space can be fabricated in the other process than the manufacturing process of the plurality of substrates with the sensing part formed therein, which are provided on a different plane from that of the substrates with the sensing part formed therein and the process is not complicated, and thereby, a physical sensor at a lower price with advantageous productivity may be provided.

In a practical assemble method of the physical sensor of the invention, for signal detection and power supply, an electrode pad of an LSI or the like and wire bonding or a bump or the like are electrically connected and a resin material is applied and mold forming is performed with a lead frame and parts of capacitors etc. Further, when a pressure sensor is applied, a structure in which the resin material is removed only from the detection part or a structure in which a passage is formed only in the detection part is adopted.

In the above described assembly method, stress generated from a resin due to the resin material is applied to the whole outer periphery of the physical sensor, and a deformable part is not preferable in the structure of the physical sensor.

In the invention, the above described cavity substrate also serves to protect the sensing space of the device substrate. In the structure of FIG. 2, generally, the larger sensing space 5a can be formed in the cap substrate 18, however, the case without the cavity substrate 9 of the invention will be explained using FIG. 3.

Figure 3:
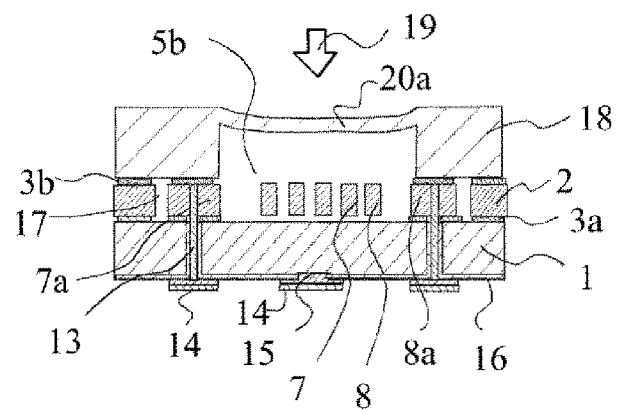
FIG. 3 is a sectional view for explanation of substrate deformation due to an external force.

FIG. 3 shows an example as an assumption of the case where molding is performed on the whole physical sensor using a resin material. In this case, as described above, stress generated from a resin 19 is applied as an external force to the physical sensor. In this regard, it is assumed that, as the volume of a sensing space 5b of the device substrate 2 is larger, the thickness of a diaphragm part 20a of the cap substrate is smaller and the diaphragm part 20a is deformed.

As a result, pressure P of a gas in the sensing space 5b increases as a volume V decreases according to formula (1). That is, it is predictable that pressure variations of the sensing space are larger. Note that n indicates an amount of substance (mole number) of the gas, R indicates a gas constant, and T indicates a thermodynamic temperature of the gas.

$$PV=nRT \quad (1)$$

Accordingly, in the structure shown in FIG. 3, it is difficult to increase the sensing space 5b volume of the device substrate 2. On the other hand, in the invention shown in FIG. 2, even when stress generated from a resin is applied from outside as an external force, deformation of a diaphragm part 20b of the cavity substrate is predictable, however, the diaphragm part 20a of the cap substrate 18 is not deformed.

Further, in comparison to the structure shown in FIG. 3, in the structure of FIG. 2 of the invention, the volume of the sensing space 5a is significantly larger than the sensing volume 5b in FIG. 3, and thus, even when the diaphragm part 20b is deformed, the change rate of the pressure P of the gas is smaller if the volume V is larger from formula (1).

On the other hand, the cost of the sensor element changes depending on how many elements can be acquired from one silicon wafer. That is, as the sensor element is made smaller, the number of sensor elements acquired from one silicon wafer larger, and the cost may be reduced.

Due to the minute gas component (outgas) and the gas generated at bonding, the pressure of the hermetically-sealed sensing part of the physical sensor is lower than the target pressure or pressure variations among the sensor elements are larger. Accordingly, it is better that the spatial volume of the above described sensing part is larger. However, as described above, downsizing is essential for cost reduction and the sensor elements should not be upsized. In the invention, the space is increased not in the lateral direction, but in the longitudinal (stacking thickness) direction of the silicon wafer, and thereby, pressure decrease or pressure variations of the sensing part are reduced at lower cost.

Figure 4:
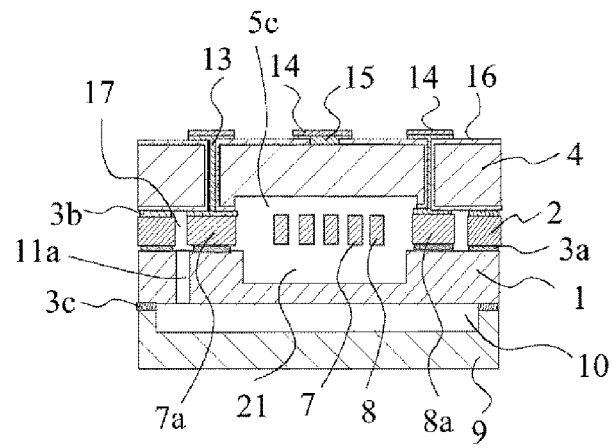
FIG. 4 is a sectional view for explanation of one example of the invention.

FIG. 4 shows a sectional view of another example of the invention. In the structure of FIG. 4, a groove 21 is formed in the handle substrate 1, and thereby, a volume of a sensing space 5c is made larger.

In the manufacturing process of the physical sensor in FIG. 4, first, the groove 21 is formed in the handle substrate 1 using photolithography and etching. Then, the device substrate 2 is attached via a thermally-oxidized film 3a. Here, direct bonding of silicon is preferable. This is because the influence of the gas generated at bonding is smaller.

In the direct bonding of silicon, first, hydrophilization treatment is performed on a silicon wafer or a silicon wafer with an oxide film formed on its surface, and bonded nearly at the room temperature. Thereby, the two silicon wafers bonded by hydrogen bonding are bonded. The bonding strength is still weaker in this state, and heat treatment is performed at a temperature from 900 degrees to 1100 degrees, and thereby, the siloxane bonding state is formed and the stronger bonding force is obtained.

Then, the fixed electrode 7 and the detection electrode 8 are formed by a deep dry-etching apparatus. Then, the electrode substrate 4 fabricated in another process is bonded in a bonding part 3b. Also, for the bonding, direct bonding of silicon may be used. Or, metal bonding electrically conducting can be applied. For example, various metal bonding methods including eutectic bonding between gold and silicon, eutectic bonding between gold and tin, and eutectic bonding between aluminum and germanium may be applied. Then, the ventilation passage 11a is formed by the deep dry-etching apparatus, and finally, the cavity substrate 9 fabricated by another process is bonded in a bonding part 3c. As the bonding method in this case, a method with a lower melting point than that of the above described metal bonding method is better. This is for prevention of separation in the bonding parts 3a and 3b.

In the invention, for the material of the cavity substrate applied to the respective structures of the physical sensor introduced as above, silicon or glass can be used. More preferably, all of the plurality of substrates are fabricated using a silicon material and the coefficients of thermal expansion of the physical sensor structures are the same, and thereby, the sensor with advantageous reliability may be provided.

On the other hand, a glass material such as borosilicate glass or TEMPAX® having a coefficient of thermal expansion closer to that of the silicon material may be applied. As the bonding method in this case, anodic bonding is preferable.

Next, an example of a combined sensor will be explained.

In the invention, sensors for measuring a plurality of physical quantities may be mounted on one substrate. In the device substrate 2 of FIG. 5, two hermetically-sealed spaces are formed. One is a first sensing space 5 in which a pressure atmosphere of the space is a vacuum atmosphere, and the other is a second sensing space 6 having a pressure atmosphere different from that. In each sensing space, the fixed electrode 7 and the detection electrode 8 are formed. A plurality of combs with gaps of several microns are formed therein. The cavity substrate 9 is formed to have the same outer dimensions as the dimensions of the device substrate, and the cavity space 10 is formed therein. The space communicates with either of the ventilation passage 11a or 11b formed in the handle substrate 1 and the electrode substrate 4 of the device substrate communicates with the sensing space 5 in which the pressure atmosphere of the space is in vacuum. Accordingly, it is known that the spatial volume of the sensing space 5 in which the pressure atmosphere of the space is in vacuum is larger.

The electrical exchange is the same as the method shown in FIG. 1.

Note that the above described ventilation passage 11b is connected to a space 17 separately provided in the device substrate 2 and connected to the sensing space 5 by a passage (not shown) provided within the device substrate.

For the above described plurality of hermetically-sealed sensing parts, at least two or more of an accelerometer, a gyroscope, and a pressure sensor may be combined, and freely arranged in response to the application.

Further, the outer diameter of the cavity substrate is provided to have the same dimension as the outer diameter of the combined sensor, and thereby, the substrates stacked and bonded at the wafer level can be dicing-processed at once and the productivity is advantageous.

An absorbent 12 such as a getter can be provided in the cavity space of the cavity substrate 9. The internal pressure may be maintained more stably by the absorbent, and long-term reliability is advantageous. Note that the provision of the absorbent may be applied to the above described respective examples.

It is better to form the above described absorbent on a thin film. This is for preventing inhibition of the volume of the cavity space. At about 500 degrees, the absorbent 12 is activated, that is, its absorption effect of the minute gas component is increased. Accordingly, in the invention of providing the absorbent, it is better to use a method of bonding at a temperature more than that for the bonding method of the respective substrates.

On the other hand, debris may be generated from the absorbent. In this case, in the ventilation passage 11a, the debris may be directly introduced into the sensing space 5. In that case, like the ventilation passage 11b, a mechanism of trapping the debris or a nozzle mechanism of preventing the debris from entering the sensing space may be provided within the device substrate.

Many movable and detection combs and beams of the order of microns are often formed in the sensing parts of the substrates in which the devices are formed, and the ratio of the sensing part to the spatial volume of the sensing part is larger. As a result, the rate of generation of the minute gas component (outgas) is larger. This is because the rate of generation of the minute gas component is higher in proportion to the size of the surface area.

On the other hand, in the space formed in the cavity substrate, there is no structure inside, and the ratio of the surface area to the volume is very small compared to that in the sensing part. Accordingly, in the space of the cavity substrate, the rate of generation of the minute gas component (outgas) is smaller.

Accordingly, the invention of communicating between the sensing parts and the cavity substrate with the ventilation passages may contribute to stabilization of pressure.

It is necessary that the spatial volume formed in the cavity substrate may be equal or more. More specifically, it is preferable that there is at least twice the volume with respect to the spatial volume of the sensing parts. As the spatial volume is larger, the influences of the minute gas component (outgas) and the generated gas at bonding can be made smaller. From the above described formula (1), when the volume becomes N times, the pressure becomes 1/N. That is, as the volume is larger, pressure variations in the sensing space may be suppressed.

As an example, regarding the ratio between the sensing volume and the surface area of the structure with combs formed therein, the value obtained by division of the surface area by the volume was about 200 times, however, the value obtained by division of the surface area by the volume in the cavity space is about 8 times. Assuming that the minute gas component is generated in proportion to the surface area, it is known that the minute gas component generated in the cavity space is extremely larger than the minute gas component generated in the sensing space. Accordingly, the cavity substrate of the invention has an effect for stability of pressure.

Figure 5:
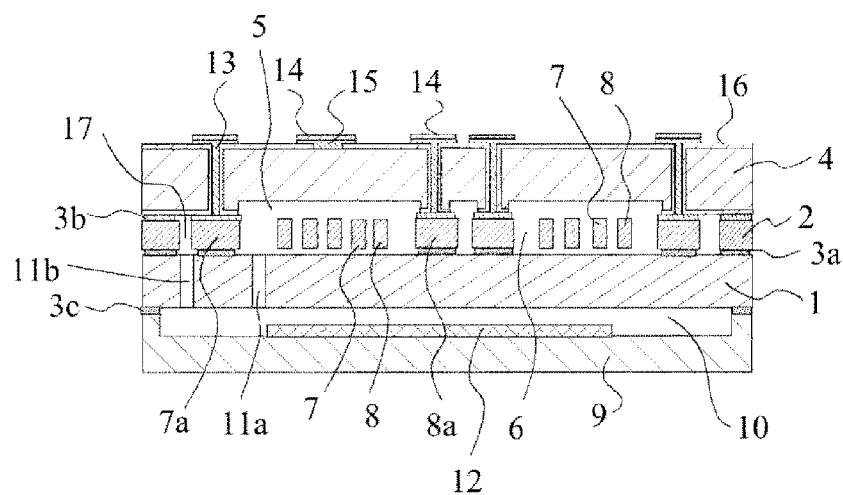
FIG. 5 is a sectional view for explanation of a combined sensor of the invention.

In the structure of FIG. 5, the cavity space 10 formed in the cavity substrate 9 can be increased to the area of the sensing space 6, and a larger space may be formed.

Further, the thickness of the cavity substrate may be freely controlled, and the thickness of the whole plurality of substrates may be adjusted. Thereby, the whole thickness of various different physical sensors may be held at constant. Accordingly, the physical sensors having the same height can be provided for final assembly, and a jig etc. applied for assembly can be provided in common.

In the combination of the plurality of hermetically-sealed sensing spaces, a combination of an accelerometer and a gyroscope is preferable. In the structure, the accelerometer is sealed nearly at the atmospheric pressure and the sensing part of the gyroscope is sealed in vacuum of about 100 Pa. The sensing part of the accelerometer is sealed at the atmospheric pressure or in vacuum from about 10000 to 50000 Pa. The sensing part of the gyroscope is connected to the cavity space of the cavity substrate, and thereby, the degree of vacuum of the sensing part of the gyroscope may be stably held and the better physical sensor may be fabricated.

The pressure atmosphere of the accelerometer part is sealed in vacuum from about 10000 to 50000 Pa because, in the hermetically-sealed space, depending on the bonding temperature, when the temperature rises from the relationship of the above described formula (1), the pressure of the hermetically-sealed space also rises. In this case, the case of separation from the bonding part is assumed depending on the bonding method. Accordingly, it is also necessary to set the reduced-pressure condition in advance.

In the above described sensing space of the accelerometer, a gas having a larger molecular weight such as argon, xenon, or krypton may be enclosed for increasing the damping effect.

In the combined sensor, accelerometers having sensing parts at different pressure can be provided. In the structure, a high-sensitivity accelerometer and a low-sensitivity accelerometer may be combined and simultaneous measurements of different acceleration can be performed.

Further, a structure in which a pressure sensor is mounted on the combined sensor for measurements of absolute pressure and gauge pressure may be applied.

At least one ventilation passage formed in the device substrate or the like fulfills the function of the invention, however, a plurality of the passages may be provided. A circular shape is preferable, however, a rectangular shape, a square shape or the like may be freely selected.

Figure 6:
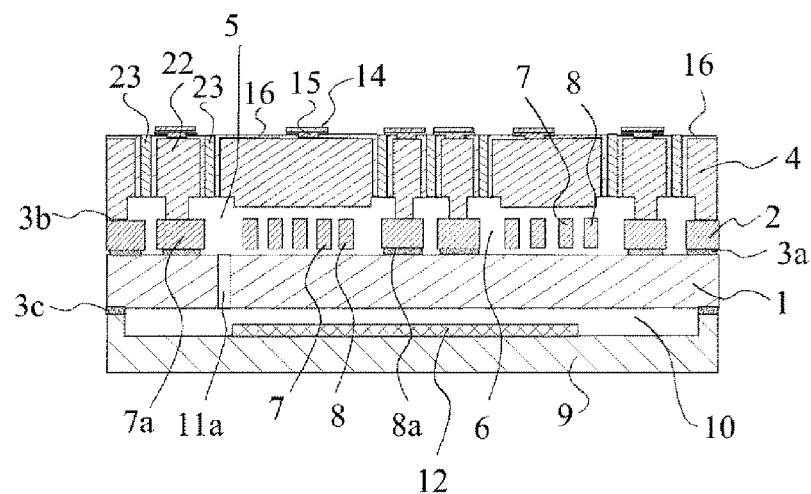
FIG. 6 is a sectional view for explanation of another combined sensor of the invention.

The invention may be applied to another combined sensor structure. The explanation will be made using FIG. 6. The structure in FIG. 6 is different in the method of drawing out the electrode in the electrode substrate 4 in the structure shown in FIG. 5. For drawing of the electrode, doped low-resistance silicon 22 is applied as an electrode. It is preferable that the resistance value of the above described low-resistance silicon is equal to or less than 0.01 Ωcm. The periphery of the electrode of the low-resistance silicon 22 is insulated by an oxide film 16 and a surrounding embedded part is embedded by an embedding material 23 of poly-Si or the like without conductivity.

In the above described structure, a gyroscope is provided in the first sensing space 5 and an accelerometer is provided in the second sensing space 6 formed in the device substrate 2. In the first sensing space 5, when an angular velocity is applied, the detection electrode 8 can move in the vertical directions, the gap between the low-resistance silicon 22 and itself changes, and thereby, the electrostatic force changes and is detected as an electric signal. Accordingly, the gap between the detection electrode and the electrode of the low-resistance silicon provided thereon is as small as several microns.

SOI wafers may be applied to the handle substrate 1 and the device substrate 2. Accordingly, the spatial volume of the sensing space 5 or 6 becomes very small. In the application example, the cavity substrate of the invention is provided, and thereby, increase by the amount of volume of the cavity space can be realized.

As a result, pressure changes of the sensing space may be absorbed and pressure variations may be suppressed. In the above described structure, there is no space for providing an absorbent in the sensing space, however, further pressure variations may be suppressed by providing the absorbent 12 in the cavity space 10.

The examples of the invention have been described above, and, it would be readily understood by a person who skilled in the art that the invention is not limited to the above described examples, but various changes can be made within the scope of the invention described in claims.

REFERENCE SIGNS LIST

1 . . . base substrate, 2 . . . device substrate, 3 . . . bonding part, 4 . . . electrode substrate, 5 . . . first sensing space in highest vacuum atmosphere, 6 . . . second sensing space, 7 . . . fixed electrode, 8 . . . detection electrode, 9 . . . cavity substrate, 10 . . . cavity space, 11 . . . ventilation passage, 12 . . . absorbent (thin-film getter), 13 . . . penetrating electrode, 14 . . . metal electrode, 15 . . . poly-Si, 16 . . . oxide film, 17 . . . space, 18 . . . cap substrate, 19 . . . stress generated from a resin, 20 . . . diaphragm, 21 . . . groove, 22 . . . low-resistance silicon, 23 . . . embedding material

The invention claimed is:

1. A physical sensor in which a sensing part that measures a physical quantity is provided in a vacuum space, comprising:
    a sensor part in which a plurality of substrates are stacked; and
    a cavity substrate having a space and provided on an upper surface side or a lower surface side of the sensor part by bonding, wherein the sensing part communicates with the space of the cavity substrate via a ventilation passage provided in the sensor part, and wherein an outer diameter of the cavity substrate is the same as an outer diameter of the sensor.

2. A physical sensor in which a sensing part that measures a physical quantity is provided in a vacuum space, comprising:

a device substrate having a sensing part that senses a physical quantity, a handle substrate that supports the device substrate, and an electrode substrate that electrically conducts from the device substrate stacked; and a cavity substrate having a space and provided in the handle substrate by bonding, wherein a space of the device substrate in which the sensing part is provided communicates with a space of the cavity substrate via a ventilation passage formed within the handle substrate.

3. A physical sensor having a plurality of sensing parts that measure physical quantities, the sensing parts provided in respective hermetically-sealed spaces, respective pressure of the plurality of sensing parts being different, comprising:

a device substrate having the sensing parts, a handle substrate that supports the device substrate, and an electrode substrate that electrically conducts from the device substrate stacked; and a cavity substrate having a space and provided in the handle substrate by bonding, wherein a space in which one sensing part of the plurality of hermetically-sealed sensing parts is provided communicates with a space of the cavity substrate via a ventilation passage formed within the handle substrate.

4. The physical sensor according to claim 1, wherein the sensing part is one sensor of an accelerometer, a gyroscope, and a pressure sensor.

5. The physical sensor according to claim 3, wherein the plurality of sensing parts include a sensor of a combination of at least two or more of an accelerometer, a gyroscope, and a pressure sensor.

6. The physical sensor according to claim 1, wherein an absorbent including a getter is provided in the cavity substrate.

7. The physical sensor according to claim 2, wherein a spatial volume formed in the cavity substrate is equal to or more than a spatial volume of the sensing part at pressure in high vacuum of the device substrate.

8. The physical sensor according to claim 2, wherein a space is formed on a lower surface side of the handle substrate and communicates with a space formed in the cavity substrate.

9. The physical sensor according to claim 2, wherein the cavity substrate is formed using silicon or glass.

10. The physical sensor according to claim 9, wherein the handle substrate and the device substrate include SOI wafers.

11. The physical sensor according to claim 3, wherein the plurality of sensing parts include an accelerometer and a gyroscope.

12. The physical sensor according to claim 3, wherein the plurality of sensing parts include accelerometers having respective sensing parts at different internal pressure.

13. The physical sensor according to claim 9, wherein the handle substrate, the device substrate, and the electrode substrate are respectively sealed by silicon direct bonding, and the cavity substrate is sealed by metal bonding.

14. The physical sensor according to claim 9, wherein the handle substrate, the device substrate, and the electrode substrate are respectively sealed by silicon direct bonding, and the cavity substrate is sealed by anodic bonding.

15. The physical sensor according to claim 9, wherein the handle substrate and the device substrate are sealed by silicon direct bonding, and the electrode substrate is sealed by metal bonding with conductivity.

* * * * *